United States Patent [19]

Fesler et al.

[11] Patent Number: 5,106,193
[45] Date of Patent: Apr. 21, 1992

[54] OPTICAL WAVEGUIDE AMPLIFIER SOURCE GYROSCOPE

[75] Inventors: Kenneth A. Fesler, Sunnyvale; Michel J. F. Digonnet, Palo Alto, both of Calif.; Byoung Y. Kim, Seoul, Rep. of Korea; Herbert J. Shaw, Stanford, Calif.

[73] Assignee: The Board of Trustees of the Leland Stanford Junior University, Stanford, Calif.

[21] Appl. No.: 565,255

[22] Filed: Aug. 9, 1990

[51] Int. Cl.⁵ .............................................. G01C 19/72
[52] U.S. Cl. ........................................ 356/350; 372/1; 372/6
[58] Field of Search .................. 356/350; 350/96.15; 250/227.27; 372/1, 6, 69, 94

[56] References Cited

U.S. PATENT DOCUMENTS

| | | |
|---|---|---|
| 4,070,118 | 1/1978 | Maslowski et al. |
| 4,280,766 | 7/1991 | Goss et al. |
| 4,299,490 | 11/1981 | Cahill et al. |
| 4,410,275 | 10/1983 | Shaw et al. ........................ 356/350 |
| 4,456,377 | 6/1984 | Shaw et al. |
| 4,480,915 | 11/1984 | Arditty et al. |
| 4,529,312 | 7/1985 | Pavlath et al. ..................... 356/350 |
| 4,529,313 | 7/1985 | Petermann et al. |
| 4,536,058 | 8/1985 | Shaw et al. |
| 4,556,279 | 12/1985 | Shaw et al. |
| 4,637,025 | 1/1987 | Snitzer et al. ........................ 372/6 |
| 4,637,722 | 1/1987 | Kim .................................. 356/350 |
| 4,671,658 | 6/1987 | Shaw et al. |
| 4,687,330 | 8/1987 | Lefevre ............................. 356/350 |
| 4,779,975 | 10/1988 | Kim |
| 4,836,676 | 6/1989 | Kim et al. ......................... 356/350 |
| 4,842,409 | 6/1989 | Arditty et al. .................... 356/350 |
| 4,848,910 | 7/1989 | Dupraz ............................. 356/350 |
| 4,859,016 | 8/1989 | Shaw et al. ........................... 372/6 |
| 4,881,817 | 11/1989 | Kim et al. |
| 4,964,131 | 10/1990 | Liu et al. ............................. 372/6 |

FOREIGN PATENT DOCUMENTS 2446482 8/1980 France .

OTHER PUBLICATIONS

R. A. Bergh, H. D. Lefevre, and H. J. Shaw, "All-Single-Mode Fiber-Optic Gyroscope with Long-Term Stability", *Optic Letters*, vol. 6, No. 10, Oct. 1981, pp. 502-504.

K. A. Fesler, B. Y. Kim, and H. J. Shaw. "Fibre Gyro Experiment Using Fibre Laser Source", *Electronics Letters*, vol. 25, No. 8, Apr. 13, 1989, pp. 534-536.

P. R. Morkel, "Erbium-Doped Fibre Superfluorescent Source for the Fibre Gyroscope", Springer Proceedings in Physics, Optical Fiber Sensors, vol, 44, Springer-Verlag Berlin, Heidelberg 1989, pp. 1321-1323.

M. J. F. Digonnet and K. Liu, "Analysis of a 1060-nm Nd:SiO₂ Superfluorescent Fiber Laser", *Journal of Lightwave Technology*, vol. 7, No. 7, Jul. 1989, pp. 1009-1015.

K. A. Fesler J. J. F. Digonnet, B. Y. Kim, and H. J. Shaw, "Stable Fiber-Source Gyroscopes", *Optics Letters*, vol. 15, No. 22, Nov. 15, 1990, pp. 1321-1323.

E. Desurvire, "Analysis of Transient Gain Saturation and Recovery in Erbium Doped Fiber Amplifiers", *IEEE Photonics Technology Letters*, vol. 1, No. 8, Aug. 1989.

(List continued on next page.)

Primary Examiner—Samuel A. Turner
Attorney, Agent, or Firm—Knobbe, Martens, Olson & Bear

[57] ABSTRACT

An improved broadband light source for a Sagnac interferometer includes a fluorescent optical medium that is pumped by light from a pump source with a sufficient intensity to cause the fluorescent optical medium to generate temporally incoherent light by superfluorescence. In the preferred embodiment, the superfluorescent optical medium comprises an optical fiber which is backward pumped. The signal output from the interferometer loop is amplified by the optical gain of the superfluorescent fiber which acts as a light source and as an amplifier. In order to avoid gain modulation in the superflorescent fiber, the modulation frequency is selected so that the modulation gain depth is substantially reduced.

20 Claims, 7 Drawing Sheets

OTHER PUBLICATIONS

P. F. Wysocki et al., "Broadband Operation of Erbium-Doped Silica-Based Fiber Lasers", *SPIE, Fiber Laser Sources and Amplifiers*, pp. 261–270, vol. 1171, Sep. 6–8, 1989.

M. J. F. Digonnet, "Theory of Operation of Three- and Four-Level Fiber Amplifiers and Sources", *SPIE, Fiber Laser Sources and Amplifiers*, pp. 8–26, vol. 1171, Sep. 6–8, 1989.

B. Y. Kim, "Fiber-Optic Device Research at Stanford University", *SPIE*, vol. 1169 Fiber Optic and Laser Sensors VII, pp. 10–15, (1989).

P. F. Wysocki et al., "Electronically Tunable, 1.55-$\mu$m Erbium-Doped Fiber Laser", *Optics Letters*, vol. 15, No. 5, pp. 273–275, Mar. 1, 1990.

C. R. Giles et al., "Transient Gain and Cross Talk in Erbium-Doped Fiber Amplifiers", *Optic Letters*, vol. 14, No. 16, pp. 880–882, Aug. 15, 1989.

R. J. Mears et al., "Low-Noise Erbium-Doped Fibre Amplifier Operating at 1:54 [m"], *Electronics Letters*, vol. 23, No. 19, pp. 1026–1028, Aug. 3, 1987.

E. Desurvire et al., "High-Gain Erbium-Doped Traveling-Wave Fiber Amplifier", *Optics Letters*, vol. 12, No. 11, pp. 888–890, Nov. 1987.

T. J. Whitley, "Laser Diode Pumped Operation of $Er^{3+}$-Doped Fibre Amplifier", *Electronics Letters*, vol. 24, No. 5, p. 1537, Oct. 4, 1988.

Masataka Nakazawa et al., "Efficient $Er^{3+}$-Doped Optical Fiber Amplifier Pumped by a 1.48 $\mu$m InGaAsP Laser Diode", *Applied Physics Letters*, vol. 54, No. 4, pp. 295–297, Jan. 23, 1989.

C. R. Giles et al., "2-Gbit/s Signal Amplification at $\lambda=1.53$ $\mu$m in an Erbium-Doped Single-Mode Fiber Amplifier", *Journal of Lightwave Technology*, vol. 7, No. 4, pp. 651–656, Apr. 1989.

M. J. Pettit et al., "Crosstalk in Erbium Doped Fibre Amplfiers", *Electronics Letters*, vol. 25, No. 6, pp. 416–417, Mar. 16, 1989.

R. I. Laming et al., "Multichannel Crosstalk and Pump Noise Characterization of $Er^{3+}$-Doped Fibre Amplifier Pumped at 980 nm", *Electronics Letters*, vol. 25, No. 7, p. 455, 1989.

E. Desurvire et al., "Amplfication of Spontaneous Emission in Erbium-Doped Single-Mode Fibers", *Journal of Lightwave Technology*, vol. 7, No. 5, pp. 835–845, May 5, 1989.

E. Desurvire et al., "Gain Saturation Effects in High-Speed, Multichannel Erbium-Doped Fiber Amplifiers at $\lambda=1.53$ $\mu$m", *Journal of Lightwave Technology*, vol. 7, No. 12, pp. 2095–2104, Dec. 1989.

K. A. Fesler et al., "Behavior of Broadband Fiber Sources in a Fiber Gyroscope", *SPIE, Fiber Laser Sources and Amplifiers*, vol. 1171, pp. 346–352, Sep. 1989.

H. Po et al., "Double Clad High Brightness Nd Fiber Laser Pumped by GaAlAs Phased Array", Optical Fiber Communication Conference (OFC '89), Houston, Tex., Feb. 6–9, 1989, Post Deadline Paper, pp. PD7-1 through PD7-4.

| CURVE NUMBER | $P_p/P^{th}$ | $P_s/P_{sat}$ |
|---|---|---|
| 1 | 10 | 10 |
| 2 | 10 | 5 |
| 3 | 10 | 2.5 |
| 4 | 10 | 1 |
| 5 | 100 | 5 |
| 6 | 100 | 2.5 |
| 7 | 100 | 1 |

OPTICAL WAVEGUIDE AMPLIFIER SOURCE GYROSCOPE

BACKGROUND OF THE INVENTION

1. Field of the Invention

The present invention is in the field of optical waveguide components, such as optical fibers, and, in particular, is in the field of fiber gyroscopes, rotation sensors and interferometers using superfluorescent fiber laser sources and the like.

2. Description of the Related Art

A Sagnac interferometer comprises an optical loop, typically of optical fiber that is used to sense rotation of an object onto which the loop is mounted. Such interferometers operate by dividing the optical energy from a light source into two substantially equal beams of light and causing the two beams of light to propagate around the loop in opposite directions. The two beams of light are combined after passing through the loop and are detected by a detector after passing through a directional coupler. The changes in intensity of the combined light caused by interference of the two beams are detected. In accordance with the well-known Sagnac effect, rotation of the object and thus of the loop of fiber causes changes in the relative phase between light propagating in the two directions which in turn causes the detected intensity to change. The rotation rate of the loop can be determined from the detected changes in the intensity. See, for example, U.S. Pat. Nos. 4,410,275; 4,529,312; 4,637,722; 4,687,330 and 4,836,676.

The light source of the interferometer is preferably a broadband source. Resonant fiber lasers (RFL's) and superfluorescent fiber lasers (SFL's) are capable of wide spectral bandwidth and high power output; such devices have better average wavelength stability versus temperature than for semiconductor diode sources. These properties, together with prospects for long life, have made them alternatives to standard superluminescent diode sources. Resonant fiber lasers offer the highest ratio of output power to pump power. Double pass superfluorescent lasers offer intermediate values and single pass superfluorescent lasers give the lowest values. All of those sources have shown susceptibility to optical feedback, resulting in large gyro instability and output errors with the resonant laser fiber source, onset of instability at low source output levels for the double pass superfluorescent fiber lasers, and similar behavior at higher but still less than optimum source output for the single pass superfluorescent fiber laser.

For example, the gyroscope disclosed in U.S. Pat. No. 4,637,025 uses a broadband light source to provide the light introduced into the loop of optical fiber. The light source in U.S. Pat. No. 4,637,025 operates by introducing a pump signal into a single-mode optical fiber having a core doped with an active fluorescent material such as neodymium or other rare earths. The pump light has a sufficient intensity to cause amplification of spontaneous emission of photons by the fluorescent material. In one embodiment (FIG. 1), pump light is input into the optical fiber via a lens. In the second of the two embodiments, the pump light is introduced via a dichroic lens that is transparent to the pump light and highly reflective of emitted light. The pump light is absorbed by the fluorescent material and excites the electrons therein to higher energy states resulting in the emission light when the electrons transition to lower states. Because of the random manner in which the spontaneous emissions occur, the amplified emitted light is effectively spontaneous fluorescence and temporally incoherent.

In order to reduce the absorption losses caused by intermediary optical devices, in particular of couplers, proposals have been made to omit the directional coupler isolating the light source from the detector. In U.S. Pat. No. 4,842,409, the light source and the photodetector are arranged collinearly, either in the form of a single semiconductor diode which is used alternatively as an emitter and as a detector of light energy, or else, by being aligned. In the latter arrangement, the light source being constituted by a semiconductor diode is coupled via both its front face and its rear face and is interposed between the photodetector and the Y-coupler (integrated optic devices are used in that patent rather than conventional optical devices). The diode is therefore used alternatively as an emitter and as an amplifier of light energy. In either case, the semiconductor diode is switched so as periodically to emit light pulses which are as long as possible, i.e. of duration just less than the time $\tau'$ required for the two beams to propagate over their entire go-and-return paths. The switching period $2\tau'$ is then very close to the period 2, of the phase modulation used for optimizing detection sensitivity since the go-and-return path length covered by the beams between the light source and the interferometer loop is small compared with the path link of the interferometer loop itself. As a result, in the output signal from the photodetector, the various components due to the modulation coming from source switching and coming from phase modulation overlap one another, thereby making it difficult to detect the useful signal. In the somehow averted by artificially doubling the propagation time of the two beams on their go-and-return paths by adding an additional length of optical fiber between the source and the Y-coupler, the additional length being equal to one fourth of the length of the interferometer loop. However, adding a significant length of optical fiber increases the bulk of the interferometer system and reduces light energy efficiency.

In U.S. Pat. No. 4,848,910, another solution is proposed to the above problem. That solution is essentially of an electronic nature and does not use the optical properties of the components. In order to obtain good energy efficiency, according to that reference, it is necessary to use emit and receive light pulses of maximum duration $\tau'$ corresponding to twice the transit time $\tau''$ taken by the light to go from the laser diode to the interferometer ring plus the transit time $\tau$ around the interferometer ring. As a result, the emit-receive switching period $2\tau'$ is very close to the phase modulation period $2\tau$. The spectrum of the signal generated by the photodetector includes spectrum lines in the vicinity of the frequency $\frac{1}{2}\tau$ caused by the modulation due to emit-receive switching of the laser diode. Those spectrum lines disturb the detection of the useful spectrum line at $\frac{1}{2}\tau$ generated by the phase modulation. U.S. Pat. No. 4,848,910 proposes to solve that problem by isolating the useful signal in a different spectrum line of the signal coming from the photodetector after the phase modulation has been combined with the modulation resulting from laser diode emit-receive switching or more generally with any amplitude modulation of the light energy emitted by the laser diode. The optical power coming from the interferometer ring has a frequency spectrum which is very rich in harmonics. So long as the two modulation frequencies are slightly different, there exists a component that may be used for measuring the relative phase difference of the two beams with maximum sensitivity for small phase differences.

Unlike the two solutions proposed in the two above-mentioned U.S patents, the present invention solves the above-mentioned problem without the need for switching the light source. The object of the present invention is also to solve the above-mentioned problem by using interesting optical properties of superfluorescent laser sources used as signal amplifiers.

SUMMARY OF THE PRESENT INVENTION

According to a first embodiment of the present invention, there is described an interferometer, comprising a sensing loop, a light source coupled to the sensing loop, the light source (i) producing an input light signal for input to the sensing loop and (ii) receiving an output signal from the sensing loop. The light source comprises a light emitting medium which exhibits an inversion modulation that is dependent on the modulation of the output signal. The inversion modulation is relatively high for output signal modulation frequencies below a transition frequency and decreases as the modulation frequency of the output signal increases above the transition frequency. The interferometer further comprises a modulator which modulates light propagating through the sensing loop such that the output signal is modulated, the modulator being driven at a frequency which causes the modulation of said output signal to be at a frequency significantly above the transition frequency to substantially reduce the inversion modulation.

The modulator preferably comprises a phase modulator having a frequency $f_m$ selected substantially in accordance with $$f_m = \frac{v}{2L}$$

where:

v is the velocity of light propagating though the sensing loop; and

L is the differential distance, measured along the sensing loop, between (a) the phase modulator and first end of the sensing loop; and (b) the phase modulator and a second end of the sensing loop.

The output signal modulation may have a frequency component at $f_m$ or a frequency of no less than about 1 kHz. That output signal modulation may have a frequency on the order of about 100–200 kHz. The transition frequency is preferably substantially less than 1 MHz and may be on the order of about 500 Hz.

In the interferometer of the present invention, the output signal preferably passes through the light source for amplification. The interferometer may additionally comprise a detector positioned to receive the output signal after the output signal passes through the light source. The light source may comprise an erbium-doped optical fiber having a cladding.

The light source preferably comprises an optical pumping source coupled to introduce pump light into the cladding.

According to a second aspect of the present invention, there is also disclosed a method of manufacturing an interferometer having a sensing loop and a detector, comprising the steps of coupling a light source having an emitting medium to the loop, positioning the light source between the sensing loop and the detector such that an output signal from the loop passes through the source to amplify the output signal, and coupling a modulator to the loop such that the output signal is modulated and coupling a generator to drive the modulator at a frequency $f_m$ which is sufficiently high in relation to inversion modulation characteristics of the emitting medium such that inversion modulation induced modulation of the output signal is substantially eliminated. Preferably, the modulator comprises a phase modulator and the following equation holds, wherein:

$$f_m = \frac{v}{2L}$$

where:

v is the velocity of light propagating through the sensing loop; and

L is the differential distance, measured along the sensing loop, between (c) the phase modulator and a first end of the sensing loop; and (d) the phase modulator and a second end of the sensing loop.

In one embodiment, the optical source comprises an erbium-doped optical fiber.

According to a third aspect of the present invention, there is disclosed a method of sensing, comprising the steps of amplifying an output signal from an interferometer to provide an amplified output signal, detecting the amplified output signal, modulating light propagating in the interferometer such that the output signal is modulated prior to the amplification of the output signal; and utilizing a frequency for the modulation that is sufficiently high to avoid inversion modulation induced modulation of the output signal during the amplification. Preferably, the step of amplifying comprises the step of passing the output signal through an optical fiber comprised of an emitting medium. The emitting medium may comprise erbium-doped silica.

According to a fourth aspect of the present invention, there is disclosed an interferometer, comprising a sensing loop, a light source coupled to the sensing loop, the light source (i) producing an input light signal for input to the sensing loop and (ii) receiving an output signal from the sensing loop, the output light being amplified by the light source to provide an amplified output signal, wherein the light source simultaneously inputs the input light signal to the sensing loop and amplifies the output signal from the sensing loop, a modulator which modulates light propagating through the sensing loop, the modulator being driven at a frequency which suppresses gain modulation in the light source; and a detector which detects the amplified output signal.

According to a fifth aspect of the present invention, there is disclosed a method of sensing, comprising inputting an input light signal to a sensing loop; outputting an modulated output signal from the sensing loop; amplifying the output signal simultaneously with the step of inputting the input light signal to the sensing loop, the amplifying step comprising passing the output signal through a gain medium; selecting the frequency of the modulation to suppress inversion modulation in the gain medium; and detecting the output signal after amplification by the gain medium

DETAILED DESCRIPTION OF THE PREFERRED EMBODIMENT

Figure 1:
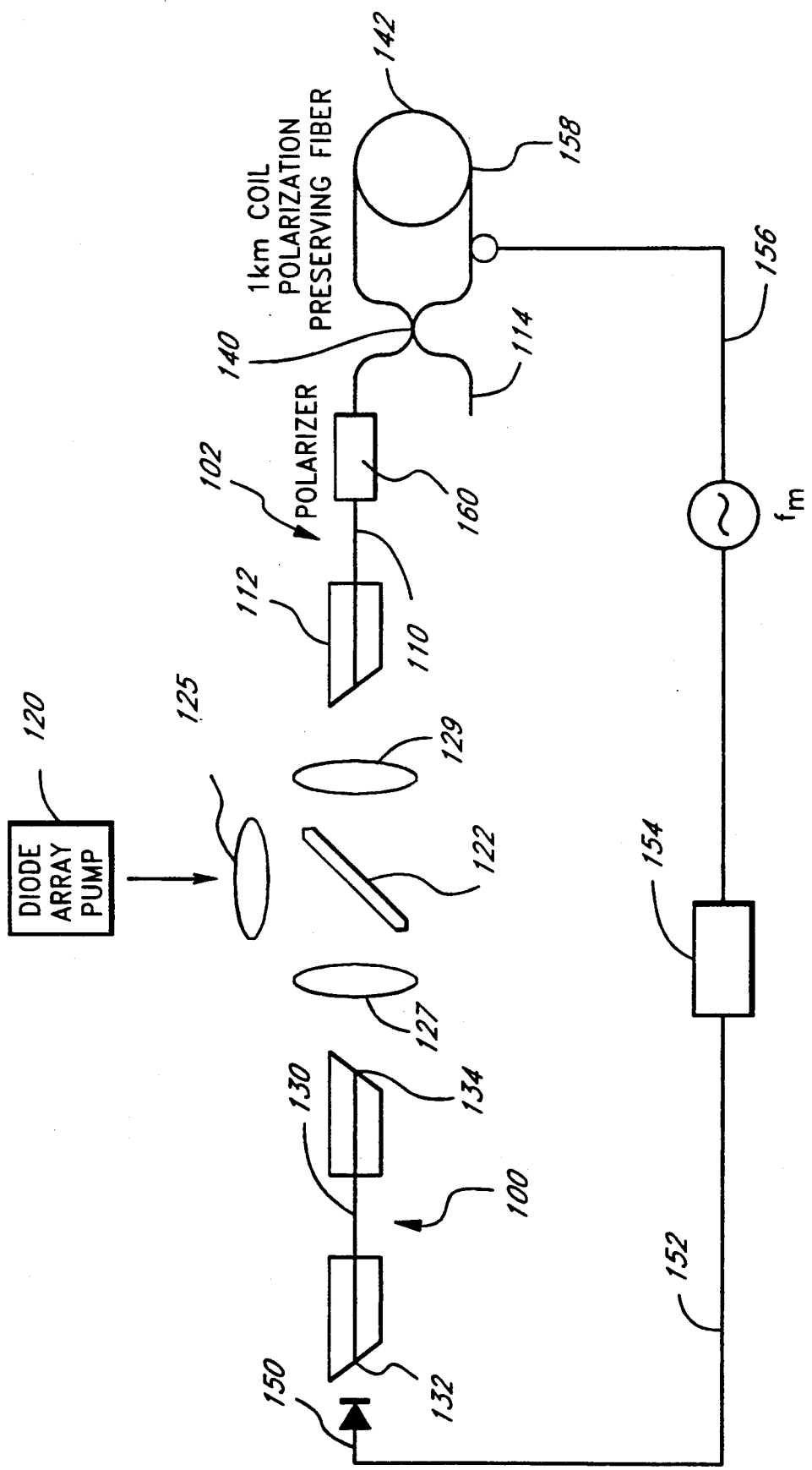
FIG. 1 is a pictorial representation of a Sagnac interferometer in accordance with the present invention, comprising a backward pumped superfluorescent fiber source, and wherein the output of the interferometer is amplified in the superfluorescent fiber source before detection.

FIG. 1 illustrates a preferred embodiment of a rotation sensor in accordance with the present invention. It shows a Sagnac interferometer 102 that includes a light source 100. The light source 100 comprises an optical waveguide such an optical fiber 130 having a first end 132 and a second end 134.

The optical fiber 130 used in the preferred embodiment is a single pass superfluorescent fiber laser source. This fiber laser source shows substantially decreased source feedback susceptibility and confirms short term noise expectations. When the superfluorescent fiber laser source 130 is pumped with optical energy within specified ranges of optical wavelengths (referred to as the absorption bands o the optical fiber), the optical fiber 130 generates output light having a wavelength responsive to the wavelength of the pump optical energy. For example, the optical fiber 130 comprises a core of a host glass that is doped with an active fluorescent material such as neodymium which absorbs light having wavelengths on the order of 0.82 microns, for example. The absorbed photons from the pump optical energy excite the electrons in the active material to higher energy electron energy states, and, when the electrons transition to lower energy levels, photons are emitted at characteristic emission bands, or fluorescing wavelengths. For example, in the case of neodymium, the emission bands are 1.06 microns and 1.35 microns. The transitions through the lower energy levels back to the ground state for spontaneous emission occur in a random manner to cause the photon emissions caused by the pump light to be amplified spontaneous fluorescence, thus causing the emitted output light to be temporally incoherent. The optical fiber 130 may also be an erbium-doped fiber. As will be described in more detail hereinafter, erbium-doped fiber laser sources have long saturation and recovery time constants which are particularly interesting to avoid crosstalk effects in the fiber.

The light source 100 includes a pump source 120 which is coupled to the second end 134 of the fluorescent optical fiber using a dichroic mirror 122. The pump light source 120 may be, for example, a laser diode, a diode array pump source or the like. In the embodiment of FIG. 1, the pump source 120 preferably comprises a diode array, such as a GaAlAs phased array. Such a diode array pump source is commercially available, such as the 500 mW Diode Labs 815 nm laser diode array manufactured by Spectra, operated at approximately 350 mW with current of 650 mA and 3 dB bandwidth of 2.75 nm. The source 120 provides an optical pump signal having a wavelength within one of the absorption bands of the fluorescent optical fiber 130, for example, 0.82 microns. The pump light provided by the pump light source 120 is introduced into the second end 134 of the optical fiber 130 via two lenses 125 and 127, and the dichroic mirror 122. The dichroic mirror 122 reflects the pump light completely. The dichroic mirror is a narrowband 815/1060 nm dichroic mirror in the preferred embodiment of the present invention utilizing the double-clad fiber. The mirror is transparent to the light at 1060 nm and reflects substantially all of the light at 815 nm. The pump light then propagates in the fluorescent material in the core of the optical fiber 130. The intensity of the pump light provided by the pump light source 120 is selected to be sufficiently great to cause a population inversion of the electrons in the fluorescent material, thereby supporting amplified spontaneous emission of light from the fluorescent material. The length of the fluorescent optical fiber 130 is selected to be sufficiently long so that substantially all the pump optical energy is absorbed by the fluorescent material.

Figure 2:
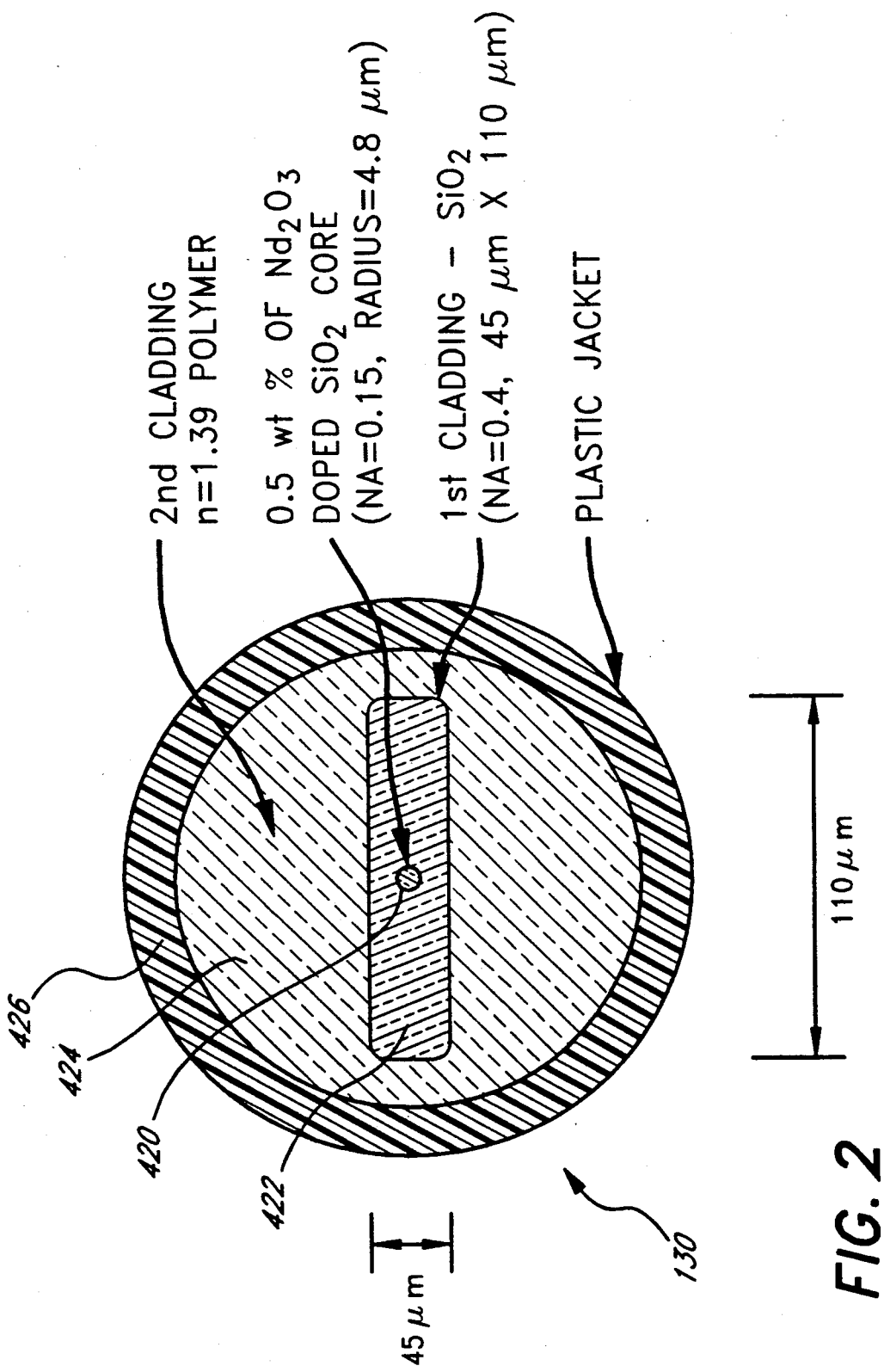
FIG. 2 is a cross-sectional view of the double-clad neodymium-doped optical fiber taken along the lines 1—1 in FIG. 1.

In an alternate preferred embodiment of the present invention, the optical fiber 130 is a double-clad neodymium doped fiber waveguide such as is available from Polaroid Corporation. The length of the fiber is approximately 20 meters. Preferably, both ends of the double-clad fiber have been polished at 15 degrees to suppress end-face reflections, as will be described in more detail hereinbelow. A doubleclad optical fiber 400 is shown in more detail in a cross sectional view in FIG. 2. As illustrated, the double-clad optical fiber 400 includes an inner core 420 comprising silica glass doped with approximately 0.5 percent by weight of $Nd_2O_3$. It can also include 3.8 percent by weight of $Al_2O_3$. The core 420 has a numerical aperture of 0.15. The core 420 has a diameter of approximately 4.8 micrometers and is surrounded by a first cladding 422 having an approximately rectangular shape (e.g., having two substantially parallel sides connected by slightly rounded ends, as shown). The first cladding 422 has approximate rectangular dimensions of 110 micrometers by 45 micrometers to provide a ratio of first cladding area to core area of approximately 274. The first cladding 422 comprises mainly silica ($SiO_2$) and is surrounded by a second cladding 424 which is a first buffer coating. The second cladding 424 comprises a soft fluro-polymer with a refractive index of approximately 1.39. The numerical aperture between the first cladding 422 and the second cladding 424 is approximately 0.4. The second cladding 424 is surrounded by a second or outer buffer coating 426 which comprises a commercial hard polymer for protecting the double-clad optical fiber 400.

The first cladding 422 permits the fiber to act as a single-mode core in a rectangular cladding. The second cladding 424 permits the fiber to act as a multimode fiber core for pump light. The cladding 422 has a large numerical aperture, and thus pump light can be introduced into the cladding at an angle with respect to the axis of the core. This permits the pump light to be coupled to the fiber 400 directly, and eliminates the need for the dichroic mirror. The pump light in the cladding 422 propagates into the single mode core, and the single-mode core absorbs the pump light, but over a longer fiber length than in the case of pump light confined to the single-mode core. The double-clad fiber can be pumped with a high-power semiconductor phased array. This is quite advantageous, since the high pump powers required for useful amounts of fluorescence from a neodymium-doped fiber are not easily obtained from a single-strip laser diode.

Returning to FIG. 1, applying pump light to the second end 134 of the fluorescent fiber 130 rather than to the opposite end 132 is referred to as "backward pumping" Various embodiments utilizing "backward pumping" are described in copending patent application Ser. No. 401,225, entitled "Superfluorescent Optical Fiber Light Source," filed on Aug. 31, 1989 and assigned to the Applicant of the present invention. This application is hereby incorporated by reference herein. The reflection of the light propagating toward the first end 132 of the fiber 130 ("the backward propagating light") was initially thought to be desirable. Applicant has however discovered that the reflection of the backward propagating light is undesirable in many applications. In particular, the loop of the interferometer 102 provides the same effect as a mirror, and up to 50 percent of the light introduced into the Sagnac interferometer 102 and propagating around the loop can be coupled back to the fluorescent optical fiber 130. If the light is reflected at the first end 132, as in U.S. Pat. No. 4,637,025, it will again propagate back toward the Sagnac interferometer 102. Under these circumstances, the optical fiber 130 and the loop of the interferometer 102 act as the two mirrors of a resonant cavity. Thus, resonant lasing can occur to cause the generation of undesirable temporally coherent laser light.

To obviate those resonance problems, the end 132 is left free of reflected light, encountered from the pump diode end facet and other component, when the pump light is coupled into the fiber 130. The first end 132 of the fluorescent optical fiber 130 is specifically formed to preclude reflections at the first end 132. For example, in FIG. 1, a slashed line across the first end 132 indicates that the first end 132 has been cut at an angle (e.g., 15 degrees) so that light propagating to the first end will be nonreflectively emitted from the first end 132. Substantially no light propagating toward the first end 132 will be reflected back toward the second end 134. In an embodiment represented in FIG. 1, each end of the optical fiber 130 is non-reflectively terminated by cutting the two ends at angles (e.g., the first end 132 and the second end 134 are cut at approximately 15 degrees). Alternatively, an anti-reflection coating can be applied to the first end 132. Thus, by properly terminating the end 132, one can suppress reflected light from this end by more than 60 dB and prevent the resonant lasing from occurring. Although the above-described "backward pumped" arrangements are advantageous and preferable, it will be apparent to the person skilled in the art that the present invention can be practiced using conventional optical arrangements.

The light energy emitted by the superfluorescent fiber 130 has a high radiant intensity relative to the light produced by a so-called super radiant light-emitting diode (LED). In addition, the emitted light has a wavelength distribution that is broader than the characteristic spectral line output of a laser diode, has a low temporal coherence, and has a principal wavelength that is generally temperature independent. The pump light coupled to the fluorescent optical fiber 130 stimulates the emission of broadband light.

Figure 3:
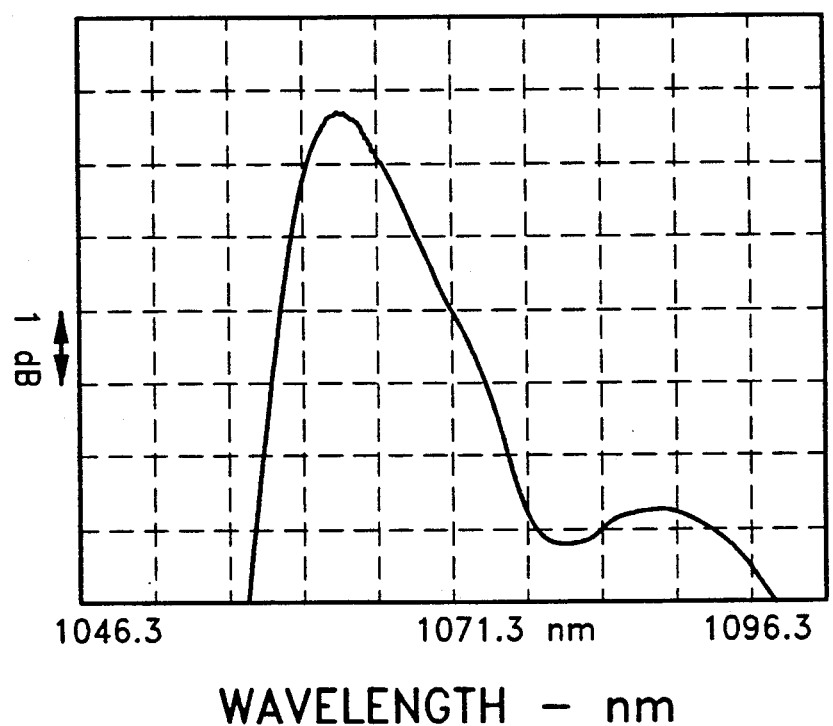
FIG. 3 is an output spectrum of the superfluorescent fiber source of the interferometer represented in FIG. 1.

The emitted light is generated in all directions within the fluorescent material in the core of the fluorescent optical fiber 130. The portion of the light initially propagating in the general direction of the second end 134 (referred to herein as the forward propagating light) will be emitted therefrom as a broadband output signal. In the case of neodymium-doped fiber, the light is emitted at 1060 nm. The 1060 nm fluorescence signal is collimated by the lens 127, transmitted trough the dichroic mirror 122 which is transparent at 1060 nm and focused by a third lens 129 into the interferometer 102 through an optical fiber 110. The fiber 110 can be a 1060 nm polarization preserving single mode Corning fiber. The SFL source 130 produces approximately 3 mW of fluorescence power with a bandwidth of approximately 10 nm, of which 1.5 mW is coupled into the gyro fiber 110. The output spectrum of the superfluorescent fiber is represented in FIG. 3. The spectrum shows a 3 dB bandwidth of about 12 nm at a wavelength of approximately 1060 nm. Preferably, the light is substantially entirely coupled from the the second end 134 to the input of the fiber 110.

In an alternate preferred embodiment of the present invention, the bulk optic portion and the dichroic mirror are replaced with a multimode fiber coupler incorporating the superfluorescent fiber 130. Such a coupler (not represented in FIG. 1) is preferably a multiplexing coupler. As described, for example, in U.S. Pat. No. 4,556,279, a multiplexing coupler is constructed so that it couples different percentages of light between the two coupler halves in accordance with the wavelength of the light. For example, the multiplexing coupler is constructed so that substantially all the light introduced into the optical fiber 130 at the wavelength of the pump signal (e.g., 0.82 $\mu$m) is not coupled and is transmitted into the fluorescent optical fiber 130 to cause the fluorescent effect described above. On the other hand, the multiplexing coupler causes the fluorescent light generated within the fluorescent optical fiber 130 and propagating in the forward direction toward the second end 134 to be coupled from the fluorescent optical fiber 130 to the optical fiber 110. The coupled light propagates in the optical fiber 110 toward the loop of the Sagnac interferometer 102. In such an alternate embodiment comprising a multiplexing coupler instead of bulk optics, the pump source can also be connected to the fiber 130 via a multimode fiber. The pump source 120 introduces light into the first end of the multimode fiber which propagates to the second end of the multimode fiber. The second end of the multimode fiber is pigtailed to the optical fiber 130 so that the light is coupled into the optical fiber 130. Those embodiments are described in the copending patent application Ser. No. 401,225, filed on Aug. 31, 1989, which is hereby incorporated by reference herein.

Returning to the interferometer 102 of FIG. 1, the broadband output signal emitted by the optical fiber 130 is introduced into the Sagnac interferometer 102 via the optical fiber 110. A directional coupler 140 forms a portion of the optical fiber 110 into a loop 142 between the two ends 112 and 114 of the optical fiber 110 The length of the loop is exemplarily approximately 1 km. The fiber 110 of the loop 142 is preferably a polarization maintaining fiber, manufactured by 3M Co., wound on a 20 cm diameter spool. The directional coupler 140 is preferably constructed in accordance with U.S. Pat. No. 4,536,058, or the like. The directional coupler 140 is exemplarily a polished type polarization maintaining coupler designed for operation at 1060 nm. The loop 142 operates as the sensing portion of the interferometer 102. The coupler 140 couples approximately 50 percent of the broadband light coupled to the optical fiber 110 from the broadband light source 100 (3 dB coupler). Fifty percent of the broadband light propagates around the loop 142 in a first direction (clockwise in FIG. 1) and approximately 50 percent propagates around the loop 142 in a second opposite direction (counterclockwise in FIG. 1). The Sagnac interferometer 102 of FIG. 1 further includes a modulator 158, preferably a phase modulator 158 driven by the processor 154 that introduces a phase modulation into the counterpropagating light signals within the loop 142 to enable the electrical output signal to be synchronously demodulated. The phase modulator is exemplarily a fiber wound PZT piezoelectric cylinder, driven at a frequency of 200 kHz (proper frequency for 1 km coil). The amplitude of the phase modulation is selected to maximize the first harmonic gyroscope output. The light propagating around the loop 142 is recombined by the directional coupler 140, and the recombined light signal propagates back toward the fluorescent fiber 130. Approximately 50 percent of the light is provided as an output signal via the first end 112 of the optical fiber 110 with the other 50 percent exiting through the second end 114 of the fiber 110. Accuracy of birefringent fiber axis alignments at the polarizer and in epoxy bonded splices in the fiber loop 142 is estimated to be within ±5 degrees.

The operation of Sagnac interferometers is well-known and will not be discussed in detail herein. One skilled in the art will recognize that additional components are frequently used to improve the operation of such interferometers. The optical insertion loss for the circuit between the first end and the second end of the superfluorescent fiber is exemplarily approximately 27 dB. Components, such as a polarizer 160 positioned on the optical fiber 110 between the end 112 of the fiber 110 and the directional coupler 140, are advantageously used in many applications. For example, the polarizer can consist of a miniature calcite rod between two GRIN lenses, having an estimated optical power extinction coefficient of better than 35 dB. One skilled in the art will also recognize that portions of the Sagnac interferometer 102 can be advantageously constructed using integrated optic components or bulk optic components.

The output of the interferometer enters the superfluorescent fiber 130 via the second end 134 after being focused by the lenses 127 and 129. The dichroic mirror 122 is once again transparent to the output light which is at the emission wavelength of the superfluorescent fiber 130. The output light is then amplified in the laser fiber 130 which now acts as an amplifier. The gyroscope optical output signal passing back through the superfluorescent fiber 130 from the second end 134 to the first end 132 experiences an amplification of approximately 30 dB in the experimental embodiment of the present invention.

The person skilled in the art will recognize that the phase modulation at the loop induces amplitude modulation of the recombined signal output by the interferometer at the same frequency as the phase modulator frequency. This amplitude modulation may cause the optical gain in the fiber to be modulated at the same frequency as well, if the amplitude modulation is strong enough and slow enough and if it is within the bandwidth of the amplifying fiber. The high values of the modulated signal deplete the upper lasing level population, causing the gain to decrease. The low values of the modulated signal do not affect the gain, causing the gain to remain unchanged. The changes in the gain are measured by the gain depth. If the gain is modulated, the depth is close to unity. When the gain is not modulated, the depth is zero. Practically, the gain depth varies between 1 and 0.

The amplitude modulated signal will also imprint an amplitude modulation to the emitted signal at the same frequency. As a result, the emitted signal and the gyroscope signal can produce resonant effects which affect the precision and the sensitivity of the interferometer. Furthermore, the modulation may be significant with regard to the actual signal to be detected and can act as a noise source.

The gain modulation varies with the excited lifetimes of the lasing material of the amplifier. The population lifetime of a lasing level is defined as the duration during which the population of the lasing level remains in the inverted state until 1/e of the population is emitted down to a lower level.

When the amplitude modulated gyroscope signal (also referred to as the output signal) propagates through the lasing medium of the fiber 130, the population in the upper lasing level changes in step with the frequency modulation of the signal. The population inversion follows the intensity variations of the output signal, owing to the fast rate at which the upper lasing level is populated from the ground state through the upper pump level and the fast rate of depletion. The upper lasing level is rapidly saturated and can follow the intensity variations. Fiber lasers have a relatively long upper lasing level lifetime. The upper lasing level is populated relatively slowly. If the frequency of the amplitude modulated output signal is high enough relative to the population lifetime and superior to a frequency herein referred to as the threshold frequency or the transition frequency, the population inversion ceases to follow the intensity variations of the output signal The source signal then sees a quasi-steady state population density in the upper lasing level with no resultant modulation from the output signal.

In the laser of the present invention, the frequency of the phase modulation is selected so that the amplitude modulated signal is high enough to prevent gain modulation. For erbium-doped fiber, the gain depth is substantially equal to 1 up to a frequency of 500 kHz, and then decreases rapidly. In Sagnac gyroscopes, the phase modulation frequency is linked to the length of the interferometer loop by the equation $f_m = v/2L$, where $f_m$ is the phase modulation frequency, v is the velocity of light propagating through the sensing loop, and L is the differential distance measured along the sensing loop between the phas modulator and a first end ofthe sensing loop and the phase modulator nad a second end ofh te sensing loop. Typically, for fiber loops of 1 km in length, the phase modulation frequency is approximately 200 kHz. At such a frequency, the gain modulation is approximately zero for an erbium-doped fiber.

The fluorescence lifetime of neodymium is on the order of 40 μs, less than the lifetime of erbium, which is 10–15 ms. Thus, the threshold frequency for erbium-doped fiber is less than the threshold frequency for neodymium-doped fibers. Yet, at frequencies on the order of 200 kHz, the gain modulation in a neodymium doped fiber is also negligible.

By contrast, laser diodes have a short upper laser lifetime. For example, the lifetime of laser diodes is on the order of a few nanoseconds, causing the threshold frequency to be quite high, on the order of 1 MHz. The gain is thus modulated in semiconductor laser diodes, even at very high frequencies. As the modulation depth depends on the strength of the feedback signal, it is possible to reduce the modulation depth in laser diodes by reducing the feedback signal. However, this substantially reduces the S/N ratio. Because of those problems, the prior art patents using laser diodes (U.S. Pat. No. 4,842,409 and U.S. Pat. No. 4,848,910) disclosed the use of switches in order to use the laser diode as a source and as an amplifier successively. This created other problems that the above-mentioned patents purported to solve.

Thus, by selecting a lasing medium with a sufficiently long upper lasing level lifetime, it is possible to substantially reduce gain modulation in the amplifying fiber. If the modulation frequency of the output signal is much greater than the transition frequency, the inversion modulation rapidly decreases to acceptable levels for gyroscope applications.

Figures 7A, 7B:
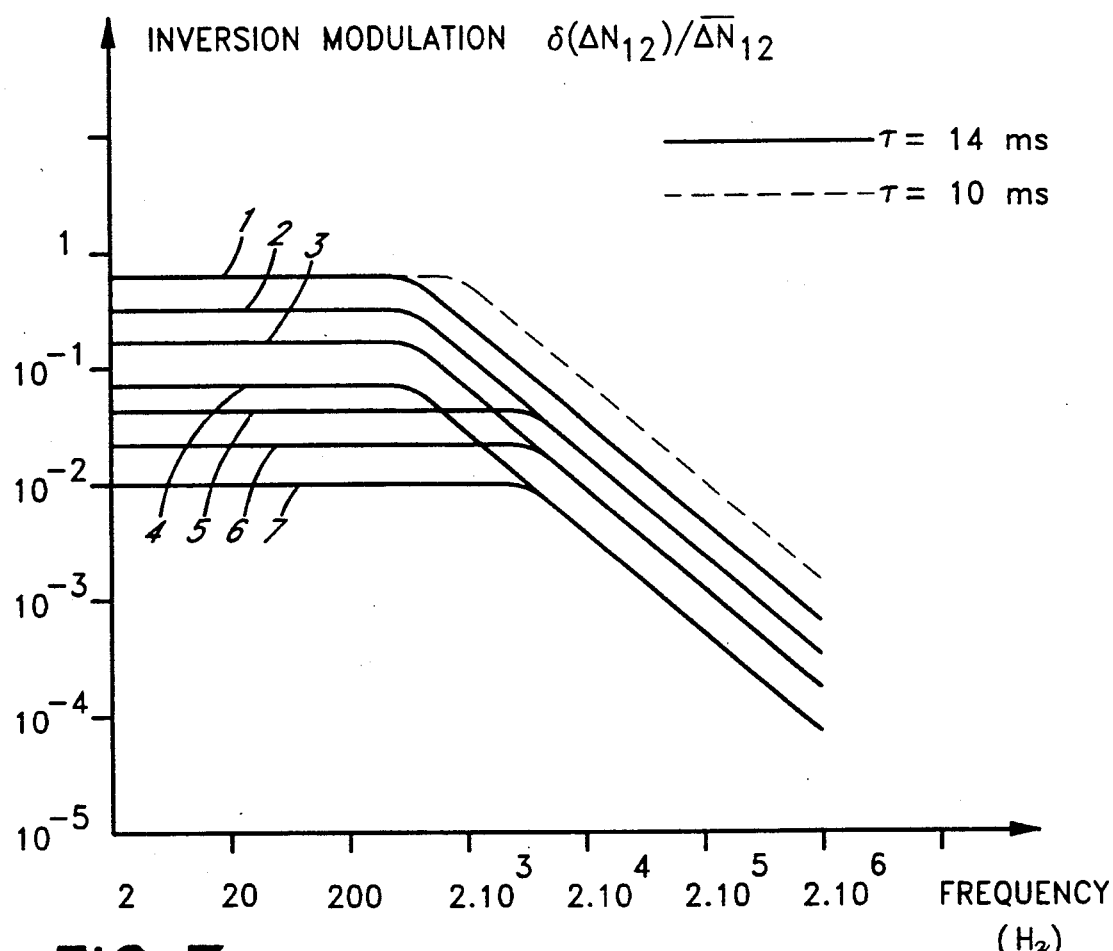
FIG. 7 is a plot of the relative saturation-induced modulation versus the frequency.

Reference is now made to FIG. 7 where the gain modulation is plotted against the frequency for different values of the input pump signal and signal powers in a log-log diagram. FIG. 7 will be described in more detail in connection with the theoretical analysis of transient gain saturation and recovery in erbium laser fibers FIG. 7 clearly shows that the gain modulation is constant and non negligible for frequencies less than a predetermined frequency referred to hereinabove as the transition frequency. However, as the frequency of the signal increases above the transition frequency, the gain modulation rapidly decays and vanishes. For example, in the case of erbium, the gain modulation is approximately equal to 0.9 for a given input pump power and signal power as represented by curve in FIG. 7 for frequencies less or equal to a transition frequency that is approximately 500 Hz. As the frequency exceeds 500 Hz, the gain modulation rapidly decreases. At frequencies above 1 KHz, the gain modulation is negligible and goes to zero. The log-log slope of the decaying gain modulation is approximately equal to $-1$.

Referring to FIG. 1 again, the output signal from the first end 132 is detected by a detector 150 which provides an electrical output signal on a line 152 provided to a processor 154. The detector is exemplarily a silicon PIN photodiode. The processor 154 processes the electrical output signal and provides a calculated output signal on a bus 156 responsive to the direction and rate at which the loop 142 is rotated. In the experimental embodiment of the present invention, the optical power at the end 132 of the superfluorescent fiber 130 is 8 mW, a portion of which is focused on the detector, producing a dc current of 0.2 mA. This high level of electrical input to the electronics advantageously simplifies the electronic signal processing circuitry.

Figure 4:
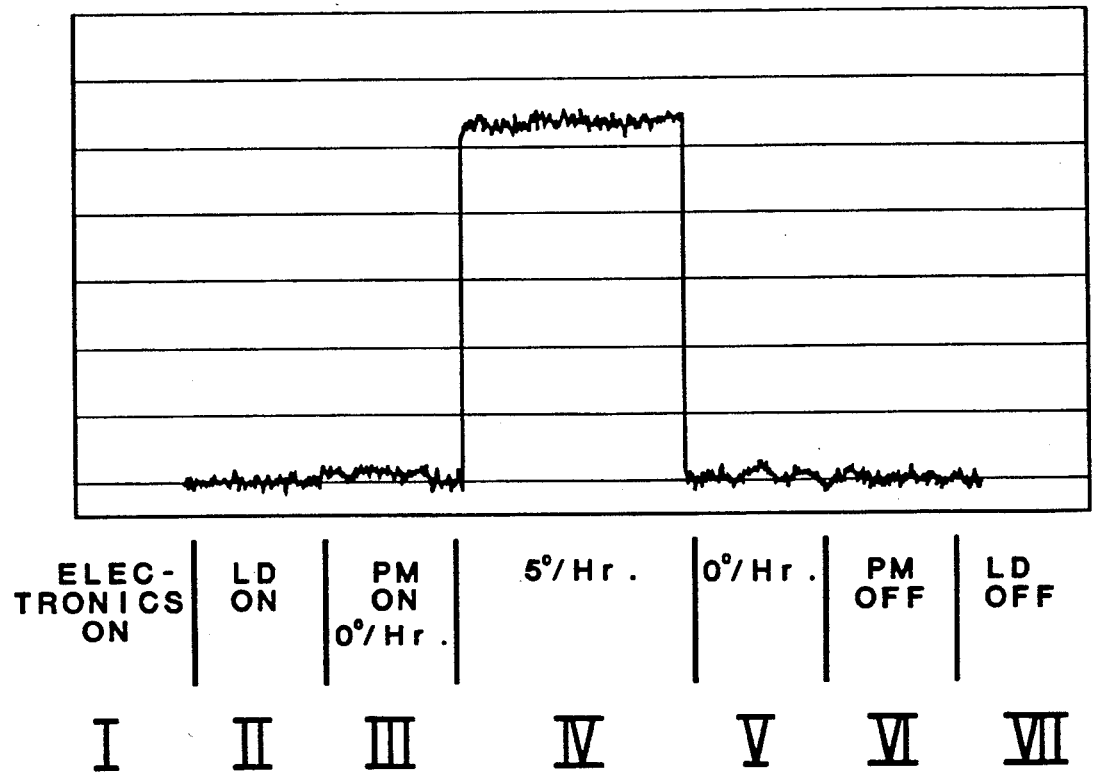
FIG. 4 is chart recording the output of the interferometer of FIG. 1.

Reference is now made to FIG. 4 which shows the experimental results obtained by the interferometer of the present invention. The strip chart comprises seven regions, labeled from I to VII. In all regions except Region IV, the gyroscope is at rest with its loop axis oriented parallel to Earth axis. In Region I, the electronics is turned on. In Region II, the pump source is on. In Region III, the phase modulator is turned on but the rotation rate is 0 degree/hour. In Region IV, the loop axis is oriented at an angle to Earth axis which gives an effective rotation rate of 5 degrees/hour. In Region V, the rotation rate is null once again. In Region VI, the phase modulator is turned off. In Region VII, the pump diode is turned off. Each major division in FIG. 4 represents 1 minute. Regions I and VII display the electronic noise floor of the system, approximately $$0.002°/hr/\sqrt{Hz}$$

Regions II and VI (with the fiber laser activated and the laser diode pump on) show rms intensity noise which can be seen to be approximately $$0.08°/hr/\sqrt{Hz}$$

and which is close to the theoretical level of the source beat noise of $$0.75°/hr/\sqrt{Hz}$$

Calculated values of short noise and Johnson noise are $$0.005 \text{ and } 0.002°/hr/\sqrt{Hz}$$

respectively. Regions III–V (phase modulator (PM) on) show the gyro response to zero and 5°/hr rotation rates.

In the low rotation rate range, the system of the present invention is stable and has rotation sensitivity of approximately $$0.08°/hr/\sqrt{Hz}$$

appears to be set by the normal beat noise associated which appears to be set by the normal beat noise associated with the bandwidth of the superfluorescent fiber laser source. It is notable that the addition of high gain optical amplification in the system of the present invention does not noticeably increase the net output noise level. The system of the present invention is substantially more sensitive than backward pumped interferometers without gain amplification. The power and current levels at the detector are three order of magnitude higher in the system of the present invention because of the large optical gain experienced by the gyroscope signal in passing back through the gain fiber.

While the optical components used in the experimental gyroscope circuit of the present invention are adequate for evaluating the short-term noise and sensitivity of the system of the present invention, they do permit bias offset and bias drifts up to ±4°/hr with temperature changes as determined from long-term drift tests. However, it will be clear to a person skilled in the art that a gyroscope circuit using optimum components may eliminate the component of source generated shift.

A theoretical analysis of transient gain saturation and recovery in erbium doped fiber amplifiers is given in an article by E. Desurvire, entitled "Analysis of Transient Gain Saturation and Recovery in Erbium Doped Fiber Amplifiers," *IEEE Photonics Technology Letters*, Volume 1, No. 8, August 1989. This article is hereby incorporated by reference herein. Although the analysis concerns erbium doped fiber used as a fiber amplifier, it is also qualitatively valid for fiber lasers doped with other lasing materials..

Figure 5:
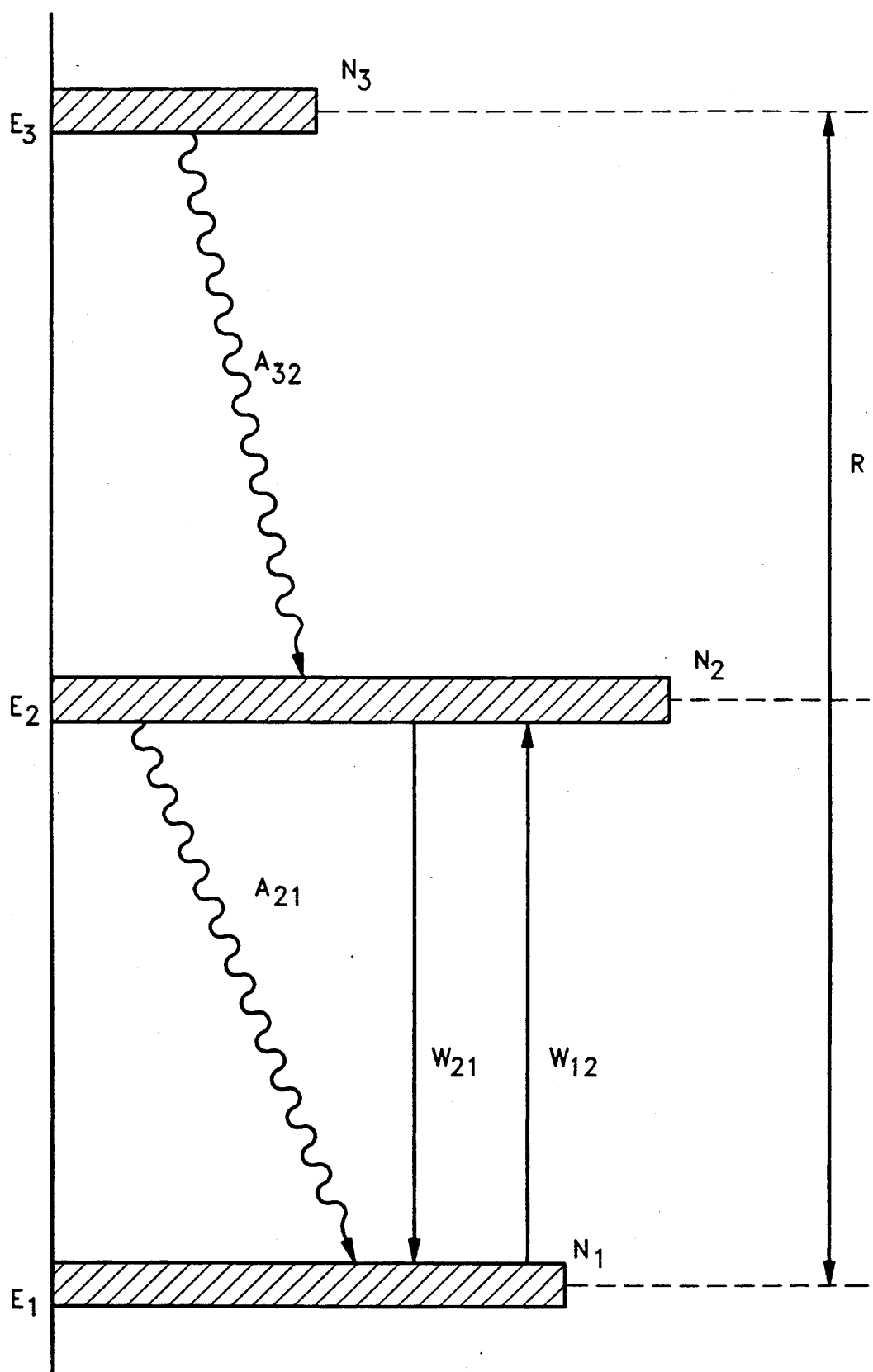
FIG. 5 is a simplified energy-level diagram of erbium glass showing different laser transitions.

Interference caused by saturation-induced crosstalk of frequency modulated rotation sensor signal output can impair the precision and the sensitivity of the measurements in fiber optic gyroscopes. As discussed above, saturation induced crosstalk is an effect of the reduction in population inversion or carrier density in the optical fiber Referring to FIG. 5, there is represented a simplified three level model of an erbium doped fiber. The model comprises three levels: the ground level, the excited level (or upper lasing level) and the upper pump level. $N_1$, $N_2$ and $N_3$ are respectively the ground level, excited level and upper-pump level populations. Level 1 corresponds to the $^4I_{13/2}$ level of (the laser transition of Er$^{3+}$ is 1.5 μm), level 2 corresponds to the $^4I_{15/2}$ level and level 3 corresponds to the pump absorption band. As represented in FIG. 5, the letters R, $A_{ij}$ and $W_{ij}$ define various rates from the various levels 1, 2 and 3. R is the pumping rate, $A_{ij} = \tau_{ij}^{-1}$ is the spontaneous decay rate from the level i to the level j with the characteristic lifetime $\tau_{in}$. For example, when the erbium fiber fluoresces, the fluorescence lifetime is given by $\tau_{21}$, i.e., the lifetime of the transition between the level 2 and the level 1. Finally, $W_{ij}$ is the stimulated emission rate.

The time-dependent rate equations for the atomic populations are given in an article by C. R. Giles and E. Desurvire, entitled "transient gain and cross-talk in erbiumdoped fiber amplifers," *Optics Letters*, Volume 14, No. 16, Aug. 15, 1989. This article is hereby incorporated by reference herein. Those equations are:

$$\frac{d}{dt}\begin{bmatrix} N_1(z,t) \\ N_2(z,t) \\ N_3(z,t) \end{bmatrix} = \begin{bmatrix} -W_{12}-R & W_{21}+A_{21} & R \\ W_{12} & -W_{21}-A_{21} & A_{32} \\ R & 0 & -A_{32}-R \end{bmatrix} \begin{bmatrix} N_1 \\ N_2 \\ N_3 \end{bmatrix} \quad (1)$$

With the above notations, the time-dependent rate equations for the level populations N1 and N2 are:

$$\frac{dN_1}{dt} = -(W_{12}+R)N_1 + (W_{21}+A_{21})N_2 + RN_3 \quad (2)$$

$$\frac{dN_2}{dt} = W_{12}N_1 - (W_{21}+A_{21})N_2 + A_{32}N_3 \quad (3)$$

In this analysis of gain saturation, it is not possible to study the gain dynamics along the entire fiber because of the non-linear nature of the effect of saturation. However, it is possible to study the gain dynamics at the end of the fiber input, where the pump signal input into the fiber and the signal emitted by the fiber are fixed by constant initial conditions. In order to simplify the calculations, $W_{12}$ and $W_{21}$ are assumed to be equal to the same value W. Assuming also that W and R at the input fiber end (z=0) have the same constant value in time for some duration, equations (2) and (3) yield the following solutions after integration:

$$N_k(z=0,t) = a_k e^{-\omega_2 t} + b_k e^{-\omega_2 t} + C_k$$

$$k = 1,2 \quad (4)$$

The time constants $\omega_1^{-1}$ and $\omega_2^{-1}$ are characteristic decay times and are given by $$\omega_1^{-1} = \tau_{21}/\left(1 + \frac{P_p(0)}{P_p^{th}} + \frac{P_s(0)}{P_{sat}}\right) \quad (5)$$

$$\omega_2^{-1} = \tau_{32}/\left(1 + \frac{\tau_{32}}{\tau_{21}} \frac{P_p(0)}{P_p^{th}}\right) \quad (6)$$

In the above equations (5) and (6), $P_p(0)$ and $P_s(0)$ are respectively the input pump power and the gyroscope signal power at z=0, i.e., at the input end of the fiber. $P_p^{th}$ is the pump threshold for population inversion whereas $P_{sat}$ is the gyroscope signal saturation power. The values of the pump threshold power and of the saturation power can be calculated theoretically. The population inversion between level 1 and level 2 is given by the difference $N_2 - N_1$. Equation (10) shows that the time dependence of the inversion is mediated by the ratios $\alpha$ and $\beta$ given by the equations:

$$\alpha = P_p(0)/P_p^{th} \quad (7)$$

$$2\beta = P_s(0)/P_{sat} \quad (8)$$

The fact that the pump threshold $P_p^{th}$ and the saturation power $P_{sat}$ are inversely proportional to $\tau_{21}^{-1}$ implies that the time constants $\omega_1$ and $\omega_2$ are actually independent of the fluorescence lifetime when is much greater than 1 or when $$P_p(0)/P_p^{th}$$

$$P_s(0)/P_{sat}$$

is much greater than 1.

In the case of erbium glasses where the decay time from the pump level $\tau_{32}$ is generally very short in comparison to the fluorescence time $\tau_{21}$, the ratio $\epsilon = \tau_{32}/\tau_{21}$ can be approximated to zero. The resolution of Equation (4) yields the populations of levels 1 and 2:

$$N_1(0,t) \approx e^{-\omega_1 t}\left[N_1^0 - \frac{1+\beta}{1+\alpha+2\beta}\right] + \frac{1+\beta}{1+\alpha+2\beta} \quad (9)$$

$$N_2(0,t) \approx e^{-\omega_1 t}\left[1 - N_1^0 - \frac{\alpha+\beta}{1+\alpha+2\beta}\right] + \frac{\alpha+\beta}{1+\alpha+2\beta} + N_3(0,t) \quad (10)$$

with $N^0_i = N^0_i(0,0)$.

The population of level 3 is given by the following equation:

$$N_3(0,t) = N^0_3 \exp(-t/\tau_{32}) \quad (10')$$

From Equations (9) and (10), it can be deduced that $N_1$ and $N_2$ can be expressed as the sum of two terms: the first term is a time-dependent term having a $\omega_1^{-1}$ characteristic 1/e lifetime and vanishing for t → ∞; the second term is constant and corresponds to steady state regime.

The following analysis will now suppose that a square pulse is input into the fiber. It will be apparent to the person skilled in the art that the same type of analysis can be carried out for a modulation signal having a different waveform such a sinusoidal signal. The square waveform has been selected to make the problem tractable analytically A saturaton signal pulse of length $\Delta T$ is thus input to the fiber. The length of the pulse is selected much greater than $\omega_1^{-1}$.

Equations (9) and (10) yield the following expression of the time-dependent inversion $\Delta N_{12}(0,t)$:

$$\Delta N_{12}(0,t) = \tag{11}$$

$$\frac{\alpha - 1}{1 + \alpha + 2\beta}\left[1 + \frac{2\beta}{1 + \alpha}\exp\left(-\frac{1 + \alpha + 2\beta}{\tau_{21}}t\right)\right]$$

for $0 \leq t < \Delta T$, $$\Delta N_{12}(0,t) = \tag{12}$$

$$\frac{\alpha - 1}{1 + \alpha}\left[1 - \frac{2\beta}{1 + \alpha + 2\beta}\exp\left(-\frac{1 + \alpha}{\tau_{21}}(t - \Delta T)\right)\right]$$

for $t \geq \Delta T$.

Figure 6A:
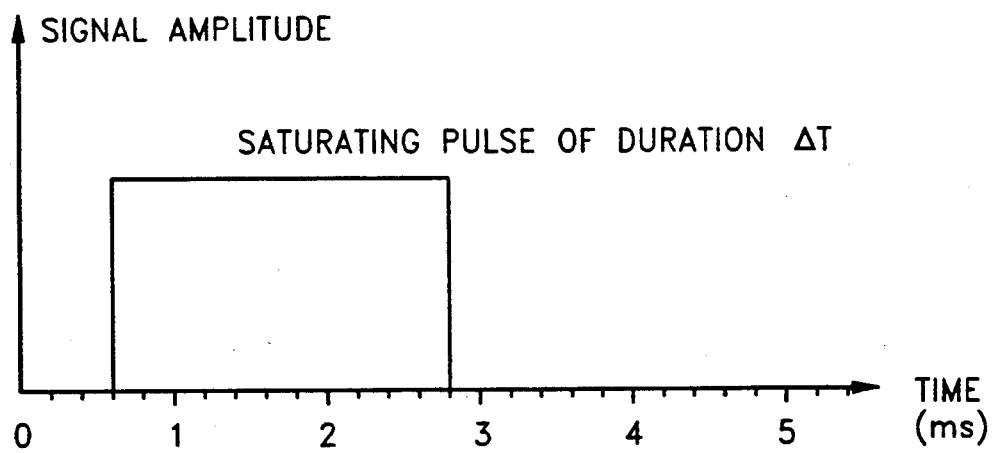
FIG. 6 is a diagram illustrating the change in population inversion $\Delta N_{12}(0,t)$ when a saturating pulse of length $\Delta T$ is input in the superfluorescent fiber laser source, showing a saturation regime followed by a recovery to initial conditions.
Figure 6B:
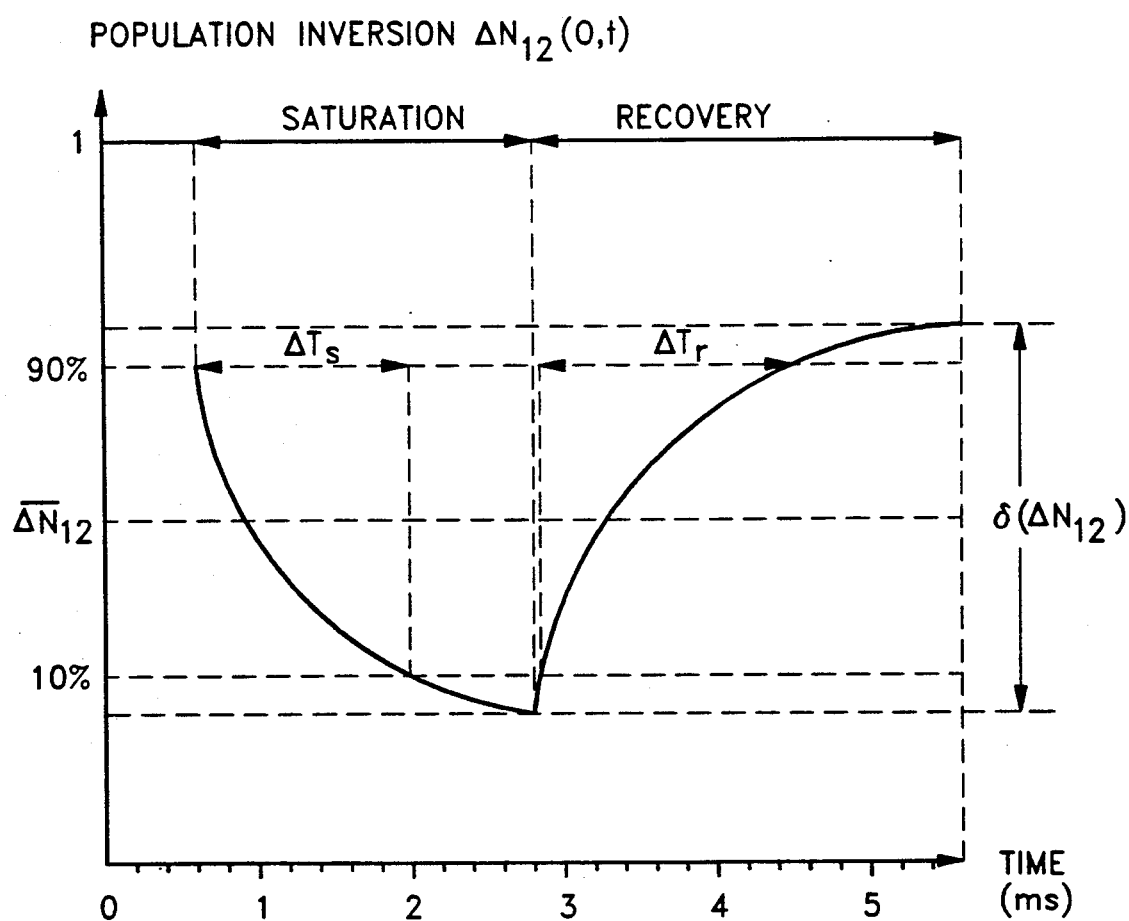

Reference is now made to FIG. 6 which shows a plot of the time-dependent inversion $\Delta N_{12}(0,t)$. FIG. 6 shows that the time-dependent inversion $\Delta N_{12}(0,t)$ decays during the signal pulse. This phase is referred to as the saturation regime. When the signal is turned off, the time-dependent inversion $\Delta N_{12}(0,t)$ returns to its initial value. This phase saturation and the recovery regime are measured by $\Delta T_s$ and $\Delta T_1$, which are defined as the time elapsed between the 90% value of the time inversion and the 10% value of the time inversion during the saturation phase and the recovery phase respectively.

The above analysis now permits to deduce that the damping effect of the gain dynamics causes the gain modulation induced by a time-varying saturating signal (such as a square waveform signal in the present theoretical analysis), to vanish as the signal frequency increases. For a square waveform modulation signal having a frequency $1/2\Delta T$ input at $t=0$ in the fiber, the relative inversion modulation, i.e., the modulation gain, is given by the equation:

$$\frac{\delta(\Delta N_{12})}{\Delta N_{12}}(B) = 2\frac{(1 - e^{-\omega/B})(1 - e^{-\omega'/B})}{(e^{-\omega/B} - e^{-\omega'/B}) + K(1 - e^{-(\omega+\omega')/B})} \tag{13}$$

where B is f/2 and f=1/$\Delta T$. The term $\delta(\Delta N_{12})$ is the difference in inversion at the end of consecutive square pulses.

$\Delta N_{12}$ is the average inversion, K is a constant and $\omega$ and $\omega'$ are given by:

$$\omega = (1+\alpha+2\beta)/\tau_{21} \text{ and } \omega' = (1+\alpha)/\tau_{21}. \tag{15}$$

Equation (13) shows that the modulation vanishes for high values of the frequency and is maximum for small values of the frequency.

Reference is now made to FIG. 7 where the relative inversion modulation (gain modulation) is plotted as a function of the frequency f for different values of $\alpha$ and $\beta$. FIG. 7 shows in a log-log plot that the slope is approximately zero for erbium up to 500 Hz and changes to $-1$ beyond. The relative saturation-induced modulation of crosstalk starts to decrease at frequencies around 500 Hz-1 kHz and vanishes at frequencies above 1000 kHz (1 Mhz). FIG. 7 shows the plots for different values of relative input pump and gyroscope signal powers. The solid lines correspond to $\tau_{21}=14$ ms. The dashed lines correspond to $\tau_{21}=10$ ms. The dashed lines are shifted to the right. This illustrates that for lower values of the upper lasing lifetime, the threshold frequency is greater.

In erbium-doped fibers, the saturation-induced gain modulation vanishes around the threshold frequency f=1 kHz. The population in the upper lasing level changes in step with the modulation of the modulation laser signal as equilibrium is established between up-pumping and stimulated emission rates. Consequently, the population inversion changes with the modulation of the signal and hence induces gain modulation. As the modulation frequency increases, the population inversion ceases to follow the intensity variations of the signal owing to the slow rate at which the upper lasing level is populated from the ground state through the upper pump level. The source signal sees a quasi-steady state population density in the upper lasing level with no resultant modulation from the modulation signal.

The present invention combines the advantages of backward pumping and using the light source as an amplifier of the gyroscope signal, and allows operation without instability or other noticeable degradation of the source characteristics at a source output power level of 34 mW. This represents an order of magnitude improvement over the previous forward pumped system and allows source noise limited rotational sensitivity to be achieved. Operation of the source as a combined source and amplifier allows gyro performance with greatly enhanced detector output levels which can simplify electronic processing. Although described above in connection with the preferred embodiments, it should be understood that modifications within the scope of the invention may be apparent to those skilled in the art, and all such modifications are intended to be within the scope of the claims of the present invention.

We claim:

1. An interferometer, comprising:
   a sensing loop;
   a light source coupled to said sensing loop, said light source (i) producing an input light signal for input to said sensing loop and (ii) receiving an output signal from said sensing loop, said light source comprising a light emitting medium which exhibits an inversion modulation that is dependent on the modulation of said output signal, said inversion modulation being relatively high for output signal modulation frequencies below a transition frequency and decreasing as the modulation frequency of the output signal increases above the transition frequency;
   a modulator which modulates light propagating through the sensing loop such that said output signal is modulated, said modulator being driven at a frequency which causes said modulation of said output signal to be at a frequency significantly above said transition frequency to substantially reduce said inversion modulation.

2. The interferometer of claim 1, wherein said modulator comprises a phase modulator having a frequency $f_m$ selected substantially in accordance with $$f_m = \frac{v}{2L}$$

where:
- v is the velocity of light propagating though the sensing loop; and
- L is the differential distance, measured along the sensing loop, between (a) the phase modulator and first end of the sensing loop; and (b) the phase modulator and a second end of the sensing loop.

3. The interferometer of claim 2, wherein said output signal modulation has a frequency component at $f_m$.

4. The interferometer of claim 1, wherein said output signal modulation has a frequency of no less than about 1 kHz.

5. The interferometer of claim 1, wherein said output signal modulation has a frequency on the order of about 100–200 kHz.

6. The interferometer of claim 1, wherein said transition frequency is substantially less than 1 MHz.

7. The interferometer of claim 1, wherein said transition frequency is on the order of about 500 Hz.

8. The interferometer of claim 1, wherein said output signal passes through said light source for amplification, said interferometer additionally comprising a detector positioned to receive said output signal after said output signal passes through said light source.

9. The interferometer of claim 1, wherein said light source comprises an erbium-doped optical fiber.

10. The interferometer of claim 1, wherein said light source comprises an optical fiber having a cladding.

11. The interferometer of claim 10, wherein said light source comprises an optical pumping source coupled to introduce pump light into said cladding.

12. The interferometer of claim 1, additionally comprising a polarizer positioned between said light source and said loop such that input light from said source passes through said polarizer and light output from said loop also passes through said polarizer.

13. A method of manufacturing an interferometer having a sensing loop and a detector, comprising:
- coupling a light source having an emitting medium to said loop;
- positioning said light source between said sensing loop and said detector such that an output signal from said loop passes through said source to amplify said output signal;
- coupling a modulator to said loop such that said output signal is modulated;
- coupling a generator to drive said modulator at a frequency $f_m$ which is sufficiently high in relation to inversion modulation characteristics of said emitting medium such that inversion modulation induced modulation of said output signal is substantially eliminated.

14. The method as claimed in claim 13, wherein said modulator comprises a phase modulator and wherein:

$$f_m = \frac{v}{2L}$$

where:
- v is the velocity of light propagating though the sensing loop; and
- L is the differential distance, measured along the sensing loop, between (a) the phase modulator and a first end of the sensing loop; and (b) the phase modulator and a second end of the sensing loop.

15. The method as claimed in claim 13, wherein said optical source comprises an erbium-doped-optical fiber.

16. A method of sensing, an ambient effect comprising:
- amplifying an output signal from an interferometer to provide an amplified output signal;
- detecting said amplified output signal;
- modulating light propagating in said interferometer such that said output signal is modulated prior to said amplification of said output signal; and
- utilizing a frequency for said modulation that is sufficiently high to avoid inversion modulation induced modulation of said output signal during said amplification.

17. The method as claimed in claim 16, wherein the step of amplifying comprises the step of passing said output signal through an optical fiber comprised of an emitting medium.

18. The method as claimed in claim 17, wherein the emitting medium comprises erbium-doped silica.

19. An interferometer, comprising:
- a sensing loop;
- a light source coupled to said sensing loop, said light source (i) producing an input light signal for input to said sensing loop and (ii) receiving an output signal from said sensing loop, said output light being amplified by said light source to provide an amplified output signal, wherein said light source simultaneously inputs said input light signal to said sensing loop and amplifies said output signal from said sensing loop;
- a modulator which modulates light propagating through the sensing loop, said modulator being driven at a frequency which suppresses gain modulation in said light source; and
- a detector which detects said amplified output signal.

20. A method of sensing, an ambient effect comprising:
- inputting an input light signal to a sensing loop;
- outputting a modulated output signal from said sensing loop;
- amplifying said output signal simultaneously with the step of inputting said input light signal to said sensing loop, said amplifying step comprising passing said output signal through a gain medium;
- selecting the frequency of said modulation to suppress inversion modulation in said gain medium; and
- detecting said output signal after amplification by said gain medium.

* * * * *

UNITED STATES PATENT AND TRADEMARK OFFICE
CERTIFICATE OF CORRECTION

PATENT NO. : 5,106,193
DATED : April 21, 1992
INVENTOR(S) : Kenneth A. Fesler et al.

It is certified that error appears in the above-identified patent and that said Letters Patent is hereby corrected as shown below:

Column 2,
Line 34, between "the" and "somehow" insert -- above-mentioned U.S. Patent No. 4,842,409, the difficulty is --

Signed and Sealed this

First Day of January, 2002

Attest:

Attesting Officer

JAMES E. ROGAN
Director of the United States Patent and Trademark Office